(12) United States Patent
Ikeda et al.

(10) Patent No.: US 8,875,397 B2
(45) Date of Patent: Nov. 4, 2014

(54) VEHICLE WHEEL MANUFACTURING METHOD

(75) Inventors: Akihiro Ikeda, Aichi (JP); Masahide Furukawa, Aichi (JP)

(73) Assignees: Central Motor Wheel Co., Ltd., Aichi (JP); Bridgestone Corporation, Tokyo (JP)

( * ) Notice: Subject to any disclaimer, the term of this patent is extended or adjusted under 35 U.S.C. 154(b) by 314 days.

(21) Appl. No.: 13/575,012
(22) PCT Filed: Jan. 20, 2011
(86) PCT No.: PCT/JP2011/050921
§ 371 (c)(1), (2), (4) Date: Jul. 24, 2012
(87) PCT Pub. No.: WO2011/105135
PCT Pub. Date: Sep. 1, 2011

(65) Prior Publication Data
US 2012/0291283 A1 Nov. 22, 2012

(30) Foreign Application Priority Data
Feb. 24, 2010 (JP) ................................ 2010-038139

(51) Int. Cl.
B21D 53/26 (2006.01)
B23P 17/00 (2006.01)
B60B 21/00 (2006.01)
B60B 21/04 (2006.01)
B60B 3/02 (2006.01)
B21D 53/30 (2006.01)

(52) U.S. Cl.
CPC ............. *B60B 21/04* (2013.01); *B60Y 2200/11* (2013.01); *B60B 2900/133* (2013.01); *B60B 2310/302* (2013.01); *B60B 2310/204* (2013.01); *B60B 3/02* (2013.01); *B21D 53/30* (2013.01)
USPC .................. 29/894.35; 29/894.3; 29/894.354; 29/515; 301/95.105

(58) Field of Classification Search
USPC .......... 301/95.104, 95.105, 95.106; 29/894.3, 29/894.31, 894.35, 894.353, 894.354, 29/894.32, 894.324, 505, 515, 521
See application file for complete search history.

(56) References Cited

U.S. PATENT DOCUMENTS 1,992,080 A * 2/1935 Ludwick ..................... 29/894.31
2,345,993 A * 4/1944 Sinclair .................... 29/894.353

(Continued)

FOREIGN PATENT DOCUMENTS

JP 2003-326904 11/2003
JP 2008-126806 6/2008

*Primary Examiner* — David Bryant
*Assistant Examiner* — Jason L Vaughan
(74) *Attorney, Agent, or Firm* — McDermott Will & Emery LLP (57) ABSTRACT

A method for manufacturing a vehicle wheel is suggested in which the vehicle wheel can provide function and effect of preventing molding defects during molding of an outer rim portion and/or an inner rim portion having sound absorbing spaces 25 and of reducing acoustic cavity noise that occurs in a tire-internal space by use of the sound absorbing spaces. After a separation groove having a curved shape groove bottom surface 55a is formed between a ring-shaped wall portion and partition wall portions, the ring-shaped wall portion is bent toward a flange portion, and the ring-shaped wall portion and the flange portion are welded together. The sound absorbing spaces which communicate with each other via communication gaps defined according to the separation groove are thereby formed in the outer rim portion and/or the inner rim portion. In such a method, since the communication gaps can be stably formed, an increase in internal pressure caused by heat expansion of air in the sound absorbing spaces during a heat treatment step can be reduced, thus allowing prevention of molding defects due to the increase in the internal pressure.

2 Claims, 6 Drawing Sheets

(56) References Cited

U.S. PATENT DOCUMENTS

| | | | | |
|---|---|---|---|---|
| 2,825,961 A | * | 3/1958 | Woodward | 29/894.353 |
| 2,878,551 A | * | 3/1959 | Woodward | 29/894.353 |
| 2,992,045 A | * | 7/1961 | Martenet | 301/95.104 |
| 3,172,787 A | * | 3/1965 | Martenet | 148/535 |
| 3,228,097 A | * | 1/1966 | Tucker | 29/894.354 |
| 5,794,340 A | * | 8/1998 | Pollkotter | 29/894.324 |
| 6,244,668 B1 | * | 6/2001 | Hale et al. | 301/95.105 |
| 6,450,583 B2 | * | 9/2002 | Hale et al. | 301/63.101 |
| 6,783,190 B1 | * | 8/2004 | Baumgartner | 301/64.102 |
| 7,346,984 B2 | * | 3/2008 | Baumgartner | 29/894.324 |
| 7,958,636 B2 | * | 6/2011 | Yoshimura | 29/894.32 |
| 2004/0143968 A1 | * | 7/2004 | Sato et al. | 29/894.354 |
| 2010/0181822 A1 | * | 7/2010 | Nakamura et al. | |
| 2011/0210601 A1 | * | 9/2011 | Yoshimura | 301/63.103 |

* cited by examiner

VEHICLE WHEEL MANUFACTURING METHOD

RELATED APPLICATIONS

This application is the U.S. National Phase under 35 U.S.C. § 371 of International Application No. PCT/JP2011/050921, filed on Jan. 20, 2011, which in turn claims the benefit of Japanese Application No. 2010-038139, filed on Feb. 24, 2010, the disclosures of which Applications are incorporated by reference herein.

FIELD OF THE INVENTION

The present invention relates to a vehicle wheel manufacturing method that allows a reduction of air column resonance (so-called acoustic cavity noise) that occurs in a tire-internal space which is sealed by a tire and a rim portion during travel of a vehicle.

BACKGROUND ART

Development of engine noise reduction technologies can reduce engine noise in vehicles such as automobiles. On the other hand, road noise due to oscillation input from the road has been becoming more perceivable during travel of a vehicle. A suggested cause of the road noise is acoustic cavity noise that occurs in a tire-internal space which is sealed by a tire and a rim portion of a vehicle wheel. The acoustic cavity noise is produced since the oscillation input from a road during travel of the vehicle causes a standing wave at a wavelength of the circumference of the tire-internal space and the standing wave causes air column resonance at a particular frequency (180 to 270 Hz).

As methods for reducing the acoustic cavity noise, configurations have been known where Helmholtz resonant sound absorber, Quincke interference silencer, and sound absorbers using side branch resonance are applied. A configuration where a plurality of auxiliary air chambers are formed circumferentially in a rim portion of a vehicle wheel and holes that communicate the auxiliary air chamber with the tire-internal space are provided is proposed in JP-A-2003-326904 ("JP '904'"), for example. Such a configuration is equipped with the Helmholtz resonant sound absorber formed with the auxiliary air chambers and is capable of reducing the acoustic cavity noise that occurs in the tire-internal space. A method that a vertical wall protruding outward in the radial direction from an outside surface of the rim portion is molded along the circumferential direction, a plurality of partition walls in the front-back direction are molded along the circumferential direction, the vertical wall is bent, and the bent vertical wall and the partition walls thereby form the plurality of auxiliary air chambers is also proposed in "JP '904'".

DISCLOSURE OF THE INVENTION

Problem to be Solved by the Invention

As the conventional configuration suggested by Patent Document 1, in the case that the auxiliary air chambers formed in the rim portion configure the Helmholtz resonant sound absorber, the Helmholtz resonant sound absorber is required to realize an obvious and sufficient effect of reducing acoustic cavity noise that occurs in the tire-internal space. It is normally required to ensure that each of the auxiliary air chambers is sufficiently sealed. Accordingly, to form the auxiliary air chambers, an end of the bent vertical wall is welded to a bead seat portion of the rim portion is proposed in "JP '904'". Furthermore, sealing side walls form the highly air-tight auxiliary air chamber. Such highly air-tight auxiliary air chambers are likewise applied in configurations having the Quincke interference silencer or the side-branch resonant sound absorber.

In steps of manufacturing a vehicle wheel, a prescribed heat treatment is performed in order to improve strength accompanying homogenization of an inner structure, a cutting process for molding the wheel into a desired product shape is thereafter performed. Accordingly, the wheel is adjusted into a desired product shape by a cutting process after a heat treatment. Therefore, in the case of "JP '904'", after the auxiliary air chambers are formed, the heat treatment is performed, and the cutting process is thereafter performed. Further, since the shapes of the holes that communicate the auxiliary air chambers with the tire-internal space may deform due to the heat treatment, the holes are formed after the heat treatment. That is, the auxiliary air chambers are sealed during the heat treatment.

In the case of "JP '904'", since each of the auxiliary air chambers is highly air-tightly sealed in their state before hole formation, the heat treatment heats and causes the air sealed in the auxiliary air chamber to expand. Then, the heat-expanded air increases the inside pressure of the auxiliary air chamber, and this may result in deformation of a portion forming the auxiliary air chamber. If the deformation is relatively large, the subsequent cutting process may cause a hole or crack in the auxiliary air chamber. Furthermore, the deformation that occurs on the design surface may result in difficulty in recovery of the design surface. In consideration of such problems, it is required to prevent the deformation of the portions forming the auxiliary air chambers due to the heat treatment as much as possible.

In the case of Patent Document 1, improper welding may occur when the bent vertical wall is welded. Such improper welding is considered to be caused by expansion of the air in the auxiliary air chambers by the welding heat. Improper welding may become a cause of deficiency such as air leakage; therefore, occurrence of improper welding has to be reduced as much as possible.

The present invention suggests a vehicle wheel manufacturing method that allows prevention of deformation due to a heat treatment during formation of a sound absorbing space which configures the Helmholtz resonant sound absorber or the like in an outer rim portion and/or an inner rim portion.

SUMMARY OF THE INVENTION

An aspect of the present invention provides a vehicle wheel manufacturing method, the vehicle wheel including: front and back flange portions and bead seat portions for supporting a bead of a tire; a well portion in a front-back direction which is formed between the front and back bead seat portions; a rim portion in which in an annular outer rim portion having the front flange portion and the front bead seat portion formed therein and/or in an annular inner rim portion having the back flange portion and the back bead seat portion formed therein, a rim cavity portion is circumferentially formed along a wheel circumferential direction, an internal space of the rim cavity portion is defined by a plurality of partition wall portions in the wheel circumferential direction to form sound absorbing spaces for damping a sound wave in a tire-internal space which is sealed by the rim portion and the tire mounted on the rim portion; and a disc portion coupled with an axle, the method including: a casting step of circumferentially forming, in a portion adjacent to at least either one of the front and back sides, a ring-shaped wall portion which protrudes outward in a radial direction from an outside surface of the well portion of the rim portion and forming the plurality of partition wall portions at regular intervals in the wheel circumferential direction between the ring-shaped wall portion and the flange portion; a bending process step of bending the ring-shaped wall portion of the rim portion toward either one of the flange portions, bringing an inside wall surface of the ring-shaped wall portion into contact with an outside end surface of each of the partition wall portions, and bringing the outer circumferential end portion of the ring-shaped wall portion into contact with the flange portion in the wheel circumferential direction; a joining step of joining the outer circumferential end portion of the bent ring-shaped wall portion with the flange portion entirely in the wheel circumferential direction to form the bead seat portions and the rim cavity portion and to produce the sound absorbing spaces parted by each of the partition wall portions; a heat treatment step of performing a prescribed heat treatment; and a hole process step of drilling a communication hole in the bent ring-shaped wall portion, the communication hole communicating the sound absorbing spaces with outside; the steps being sequentially performed, in which before the bending process step, a separation groove having a curved shape groove bottom surface at a prescribed depth is formed in a width direction of each of the partition wall portions between the ring-shaped wall portion and each of the partition wall portions, and by bending the ring-shaped wall portion toward the flange portion in the bending process step, communication gaps which communicate the adjacent sound absorbing spaces with each other are defined by the separation groove between the inside wall surface of the ring-shaped wall portion and the outside end surfaces of the partition wall portions. In other words, in the vehicle wheel manufacturing method in accordance with the present invention, the rim portion and the disc portion are unitarily molded by casting.

According to such a method, after the separation groove is formed between the ring-shaped wall portion and each of the partition wall portions that are molded by the casting step, the ring-shaped wall portion is bent by the bending process step, thereby allowing formation of the communication gaps between the bent ring-shaped wall portion and the partition wall portions by use of the separation groove. The ring-shaped wall portion is separated from the partition wall portions by the separation groove, and when the ring-shaped wall portion undergoes the bending process step, gaps are formed across which the ring-shaped wall portion and the partition wall portions do not contact with each other. This provides the communication gaps. Accordingly, the communication gaps are determined according to the dimensions and shape of the separation groove and thereby can be formed in a stable size. In other words, by providing the separation groove, the communication gaps in a desired size can be produced with high reproducibility and stability.

As described above, the adjacent sound absorbing spaces formed by the bending process and joining steps prior to the heat treatment step (the sound absorbing spaces in a state before formation of the communication hole) communicate with each other via the communication gaps. In other words, the plurality of sound absorbing spaces share a unitary space. Accordingly, even if the air in each of the sound absorbing spaces expands in the heat treatment step, the air can move through the communication gaps. An increase in the internal pressure in the sound absorbing spaces due to the heat expansion of the air can be reduced, thus allowing prevention of deformation of the portions (outer and inner rim portions) configuring the sound absorbing spaces due to the increase in the internal pressure. Accordingly, the method in accordance with the present invention allows prevention of deformation of the portions configuring the sound absorbing spaces caused by the heat treatment and a reduction of molding defects due to the deformation as much as possible.

In the manufacturing method of the present invention, a method can be preferably used such that before the joining step or before the heat treatment step and after the joining step, a hole drilling step of drilling an air hole is performed. The air hole is designed to communicate the internal spaces in the rim cavity portion and the outside, and at least one air hole is preferably provided in the portions (outer and inner rim portions) configuring the rim cavity portion. The sound absorbing spaces communicate with each other via the respective communication gaps, thus communicating with the air hole. Accordingly, the heat-expanded air in each of the sound absorbing spaces in the heat treatment step can be discharged, and the effect of preventing the deformation due to the heat treatment can be thus further improved. In a case of forming the rim cavity portion in the outer rim portion, a valve hole for attaching a valve is usually drilled. Accordingly, the valve hole or its lead hole can be used as the air hole. As described later, in the above case that the joining step is performed by welding, the effect of preventing the deformation due to the welding heat is further improved.

The separation groove has its groove bottom surface formed into a curved shape. Therefore, the bent ring-shaped wall portion and the partition wall portions do not contact with each other at the separation wall portion, and the communication gaps can be certainly and stably formed. Further, the size of the communication gap is determined according to the depth and width of the separation groove and the radius of curvature of the groove bottom surface. Accordingly, the dimensions and shape of the separation groove are set, thereby allowing stable reproduction of the communication gaps in a desired size.

Hypothetically, if the ring-shaped wall portion were bent without providing the separation groove between the ring-shaped wall portion and the partition wall portions, very small gaps might be accidentally formed between the bent ring-shaped wall portion and the partition wall portions. However, such accidentally formed gaps are not necessarily formed, and their sizes (gap areas) are not consistent. Accordingly, when compared to the communication gaps formed by the manufacturing method of the present invention, such a configuration will not provide sufficient function and effect of reducing the increase in the internal pressure due to the heat-expanded air. Therefore, the method without forming the separation groove is not capable of stably providing sufficient effect of preventing the deformation due to the heat treatment and cannot be adapted to a production line of vehicle wheels.

According to the above-described features, the manufacturing method in accordance with the present invention allows stable formation of the communication gaps which communicate the adjacent sound absorbing spaces with each other and stably provides the effect of reducing improper welding. Therefore the method can be sufficiently applicable to a production line of vehicle wheels.

Further, in the manufacturing method of the present invention, in a case that the outer circumferential end portion of the bent ring-shaped wall portion and the flange portion are welded together in the welding step, the air in the sound absorbing spaces expands due to the heat produced during the welding (hereinafter referred to as "welding heat"). Similarly to the above descriptions, the increase in the internal pressure due to the expanded air can be reduced, thus allowing prevention of deformation caused by the welding heat. Accordingly, occurrence of improper welding can be reduced as much as possible.

On the other hand, the sound absorbing spaces communicate with the tire-internal space which is sealed by the mounted tire and the rim portion via the respective communication holes. Accordingly, the sound absorbing spaces and the communication holes allow formation of Helmholtz resonant sound absorber, Quincke interference silencer, and side-branch resonant sound absorber that can reduce acoustic cavity noise that occurs in the tire-internal space. It is required that the air-tightness of the sound absorbing spaces is secured by controlling the size of the communication gaps, so that the sound absorbing spaces can provide the function and effect of the Helmholtz resonant sound absorber or the like. In the manufacturing method of the present invention, since the size of the communication gaps can be set according to the separation groove, the communication gaps can be stably formed in a size suitable for the Helmholtz resonant sound absorber or the like. In cases of configuring the Helmholtz resonant sound absorber, Quincke interference silencer, and side-branch resonant sound absorber, it is necessary to appropriately set the dimensions and shape of the sound absorbing spaces and the communication holes so that acoustic cavity noise in the tire-internal space can be reduced.

In the manufacturing method of the present invention, the separation groove may be molded by the casting step or may be molded after the casting step. Further, in the manufacturing method of the present invention, the bending process step is preferably performed while at least the inside wall surface of the ring-shaped wall portion and the outside end surfaces of the partition wall portions maintain their casting surfaces that are produced by casting. This enhances tight fitting between the inside wall surface of the bent ring-shaped wall portion and the outside end surfaces of the partition wall portions. Accordingly, since gaps between the sound absorbing spaces defined by the respective partition wall portions can be limited to the communication gaps, the communication gaps that can be stably formed in a desired size can stably provide the function and effect.

In the manufacturing method of the present invention, the ring-shaped wall portion is preferably formed adjacent to the front flange portion. Further, the ring-shaped wall portion is formed adjacent to the front flange portion, and both of them are welded by the bending process and welding steps to form the front bead seat portion, thereby forming the rim cavity portion and the sound absorbing spaces in the outer rim portion. This allows thinning of the outer rim portion and thereby a reduction of its weight.

Another aspect of the present invention provides the vehicle wheel manufacturing method, in which the separation groove is formed between the ring-shaped wall portion and each of the partition wall portions such that an aperture ratio of the communication holes formed between the inside wall surface of the bent ring-shaped wall portion and the outside end surface of the partition wall portions with respect to cross-sectional areas of the sound absorbing spaces produced by the joining step falls within a range between 0.1% and 30%.

As described above, the communication gaps can be formed into a stable size according to the separation groove. Accordingly, in such a manufacturing method of the present invention, the dimensions and shape such as the depth and width of the separation groove and the radius of curvature of the groove bottom surface are set, thereby stably molding the communication gaps with a desired aperture ratio within the range. On the other hand, if the aperture ratio of the communication gap is smaller than 0.1%, the unity of the sound absorbing spaces becomes extremely low. This may impair the function and effect of reducing the increase in the internal pressure due to the heat expansion of air caused in the sound absorbing spaces. Further, it may be difficult to stably form the communication gaps with an aperture ratio of smaller than 0.1%. Moreover, since the aperture ratio of larger than 30% may result in insufficient air-tightness of the sound absorbing spaces, the function and effect of the Helmholtz resonant sound absorber, Quincke interference silencer, and side-branch resonant sound absorber cannot be sufficiently provided. According to the above-described features, the dimensions and shape of the separation groove are set to form the communication gaps with the aperture ratio. Accordingly, the function and effect of reducing improper welding as much as possible and the function and effect of allowing formation of the sound absorbing spaces that reduce acoustic cavity noise in the tire-internal space can be both more appropriately realized.

In the manufacturing method of the present invention, the aperture ratio of the communication gaps is preferably set between 0.2% and 20% and is more preferably set between 0.5% and 10%. Setting the aperture ratio in such a manner further improves the functions and effects of reducing the increase in the internal pressure due to the heat expansion of air and of reducing acoustic cavity noise in the tire-internal space.

Effect of the Invention

In the vehicle wheel manufacturing method in accordance with the present invention, as described above, after the separation groove at a prescribed depth having the groove bottom surface in the curved shape is formed between the ring-shaped wall portion and the partition wall portions that are molded by the casting step, the ring-shaped wall portion is bent toward the flange portion, and the ring-shaped wall portion and the flange portion are welded together. Further, the communication hole is drilled, the sound absorbing spaces defined by the partition wall portions are formed in the outer rim portion and/or the inner rim portion, and the communication gaps for communicating the adjacent sound absorbing spaces with each other are defined. Accordingly, the separation groove allows stable formation of the communication gaps where the bent ring-shaped wall portion and the partition wall portions do not contact with each other. Therefore, even if the air in the sound absorbing spaces expands by heat during the heat treatment step after the joining step, since the sound absorbing spaces share the unitary space via the communication gaps, the increase in the internal pressure due to the heat expansion can be reduced, and the deformation in the portions (outer and/or inner rim portions) configuring the sound absorbing spaces can be prevented as much as possible. Particularly, since the communication gaps can be stably formed according to the dimensions and shape of the separation groove, they are highly reproducible, and the unity of the sound absorbing spaces can be sufficiently and stably secured, thus stably providing the effect of preventing the deformation. In a case that the joining step is performed by welding, the similar effect of preventing deformation caused by heat-expanded air due to welding heat can be provided. Further, since the size of the communication gaps can be stably set, the sound absorbing spaces can configure the Helmholtz resonant sound absorber, Quincke interference silencer, and side-branch resonant sound absorber that reduce acoustic cavity noise in the tire-internal space. Therefore, the manufacturing method of the present invention allows a reduction in the increase in the internal pressure in the sound absorbing spaces during the heat treatment and prevention of molding defects as much as possible and allows manufacture of a vehicle wheel including the sound absorbing spaces that provides the function and effect of reducing acoustic cavity noise in the tire-internal space.

In the above-described vehicle wheel manufacturing method, in the case that the separation groove is formed between the ring-shaped wall portion and each of the partition wall portions such that the aperture ratio of the communication gaps with respect to the cross-sectional area of the sound absorbing spaces produced by the joining step falls within a range between 0.1% and 30%, the dimensions and shape such as the groove depth and width of the separation groove and the radius of curvature of the groove bottom surface are set, thereby stably molding the communication gaps with a desired aperture ratio within the range. This allows a further improvement in the function and effect of preventing molding defects due to the increase in the internal pressure in the sound absorbing spaces during the heat treatment and allows to obtain the vehicle wheel including the sound absorbing spaces that further improve the function and effect of reducing acoustic cavity noise in the tire-internal space.

DETAILED DESCRIPTION

Figure 1:
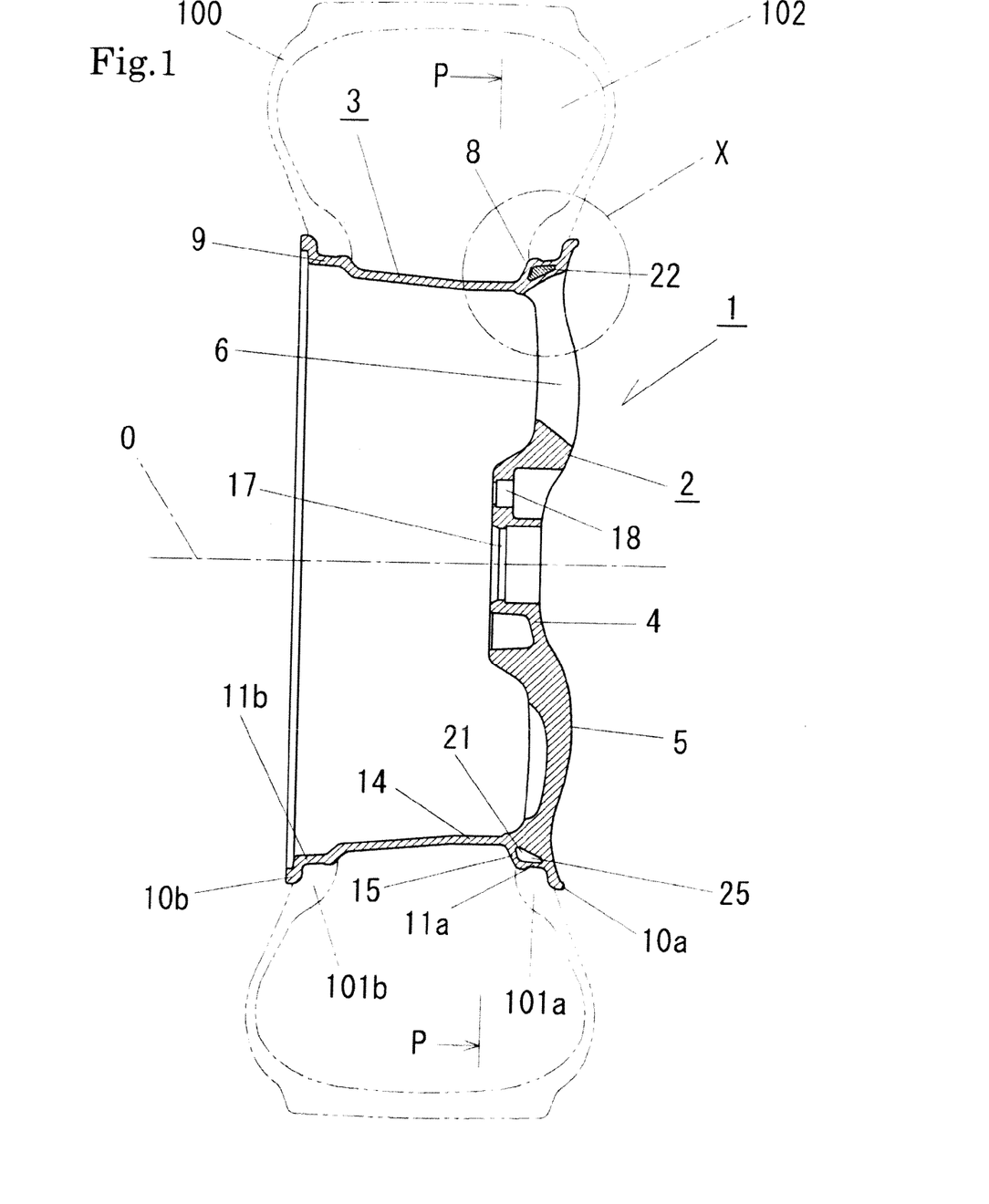
FIG. 1 is a vertical cross-sectional view of a vehicle wheel 1 of a first embodiment.
Figure 2:
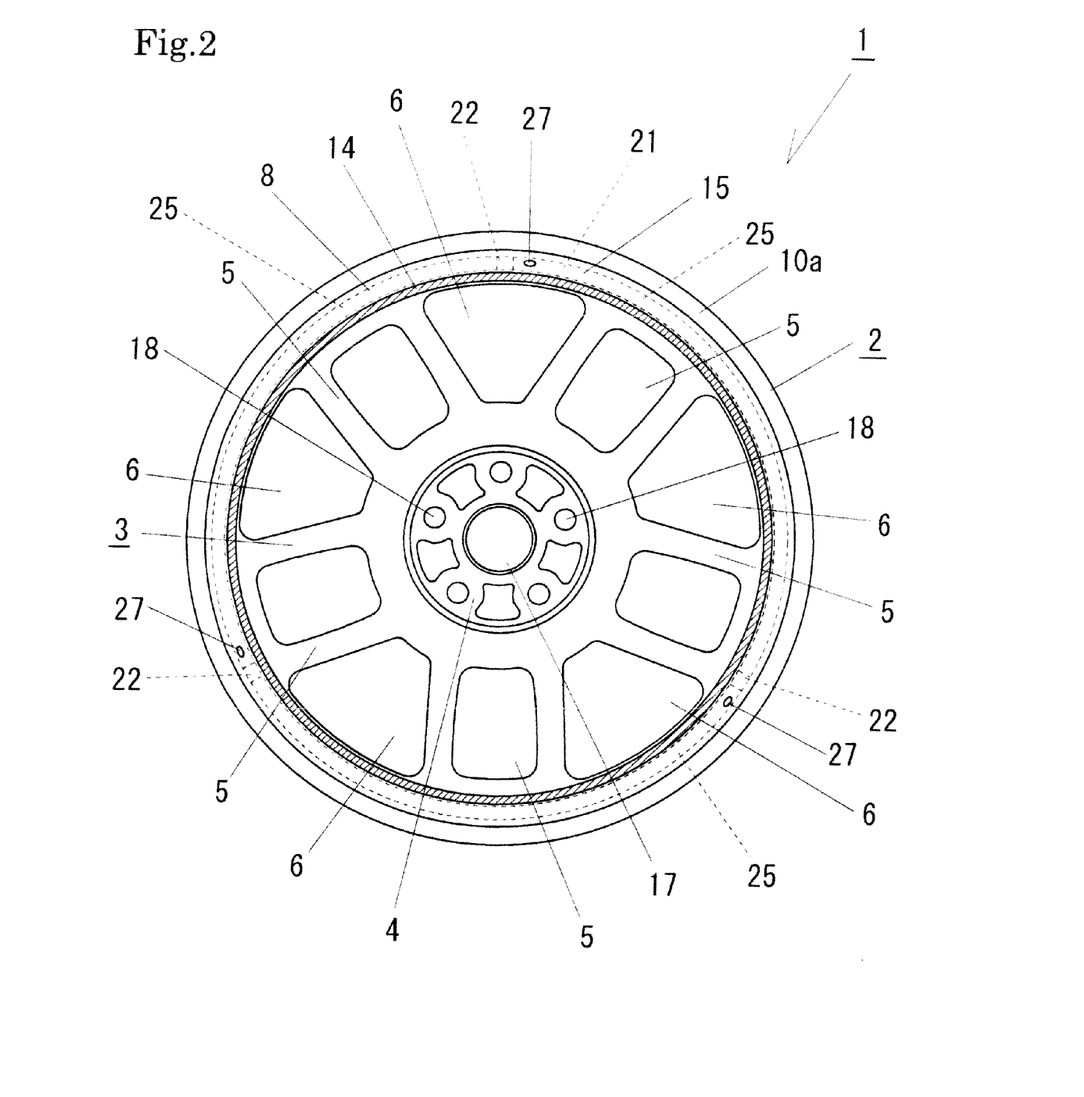
FIG. 2 is a cross-sectional view taken along the line P-P in FIG. 1.
Figure 3:
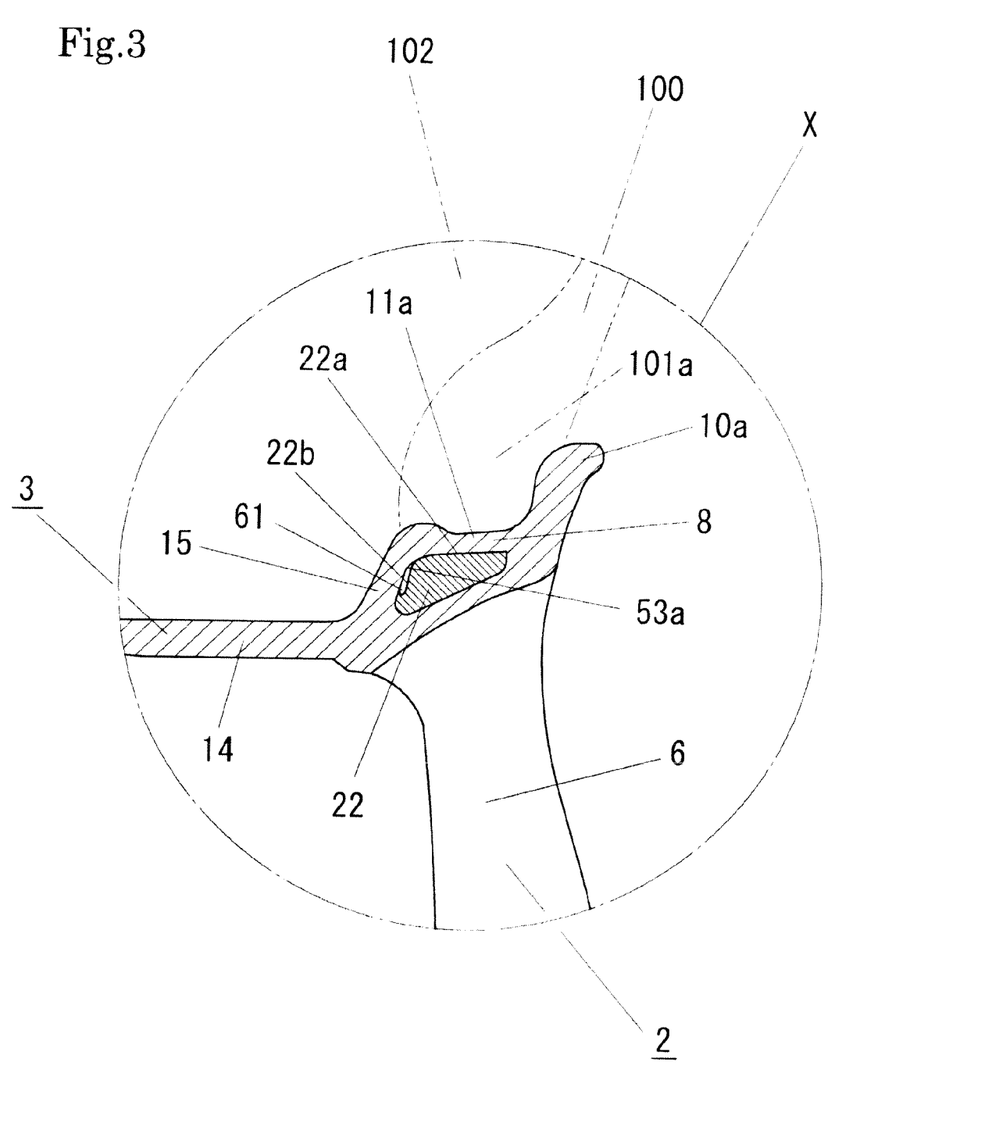
FIG. 3 is an enlarged view of an X section in FIG. 1.

A vehicle wheel which is molded by a method for manufacturing a vehicle wheel 1 in accordance with the present invention will be described with reference to FIGS. 1 to 3. The vehicle wheel 1 is formed by unitarily molding an aluminum alloy by casting and includes a disc portion 2 to which an axle is coupled and a rim portion 3 on which a tire is mounted. In this embodiment, the direction from the back side of the disc portion 2 toward the design surface is referred to as the front direction, and its opposite direction is referred to as the back direction. Further, the direction toward the central axial line O of the vehicle wheel 1 along the wheel radial direction which is orthogonal to the central axial line O is referred to as the radially inward direction, and its opposite direction is referred to as the radially outward direction.

The disc portion 2 includes a generally disc-shaped hub mount portion 4 and a plurality of spoke portions 5 provided radially outward from an outer rim of the hub mount portion 4. The hub mount portion 4 has a hub hole 17 at its center and a plurality of bolt holes 18 in positions at regular intervals to each other in the circumferential direction, outside the hub hole 17. Respective ornamental holes 6 are formed between the adjacent spoke portions 5.

Further, in the rim portion 3, front and back flange portions 10a and 10b for holding beads 101a and 101b from their sides of a tire 100 are formed at opening edges at both ends of the rim portion 3, and front and back bead seat portions 11a and 11b for supporting and fixing the beads of tire seated thereon are formed in the respective flange portions 10a and 10b. A well portion 14 into which the beads are fitted when the tire is mounted is provided along the front-back direction between the bead seat portions 11a and 11b on both the front and back sides. The front bead seat portion 11a and well portion 14 are combined together via a well wall portion 15. A portion in which the front flange portion 10a and front bead seat portion 11a are formed is an outer rim 8 in accordance with the present invention. A portion in which the back flange portion 10b and the back bead seat portion 11b are formed is an inner rim portion 9 in accordance with the present invention. In this embodiment, the outer rim portion 8 includes the well wall portion 15.

In the vehicle wheel 1, a surface of the disc portion 2 which provides the appearance of the wheel when the vehicle wheel 1 is mounted to a vehicle forms a so-called design surface. Each of the portions of the vehicle wheel 1 is concentrically formed about the central axial line O. In the state where a prescribed tire 100 is mounted on the vehicle wheel 1, a ring-shaped tire-internal space 102 sealed by the rim portion 3 and the tire 100 is formed.

Further, in the vehicle wheel 1 of this embodiment, a rim cavity portion 21 formed by an internal space having a deformed cross section (generally triangular cross section in this embodiment) is circumferentially formed in the outer rim portion 8 of the rim portion 3. Three partition wall portions 22 which define the internal space of the rim cavity portion 21 in the wheel circumferential direction are formed at regular intervals in the wheel circumferential direction. The partition wall portions 22 separate the internal space of the rim cavity portion 21 into three sound absorbing spaces 25. Further, the well wall portion 15 of the outer rim portion 8 has three communication holes 27 for communicating the sound absorbing spaces 25 with the tire-internal space 102 which are opened at regular intervals in the wheel circumferential direction.

In this embodiment, the sound absorbing spaces 25 and the communication holes 27 are provided at regular intervals in the wheel circumferential direction, and each of the sound absorbing spaces 25 has the same volume, thereby configuring a Helmholtz resonant sound absorber which reduces acoustic cavity noise that occurs in the tire-internal space 102. The volume (cross-sectional area and length in the wheel circumferential direction) of the sound absorbing space 25 and the cross-sectional area (opening diameter) of the communication hole 27 are set according to the frequency of the acoustic cavity noise in order to reduce the acoustic cavity noise that occurs in the tire-internal space 102. In other words, the volume of the sound absorbing space 25 and the opening diameter of the communication hole 27 are set such that the sound absorbing spaces 25 provides function and effect of the Helmholtz resonant sound absorber against a particular frequency band (180 to 270 Hz) responsible for the column resonance in the tire-internal space 102. The sound absorbing spaces 25 and the communication holes 27 are provided as described above, and the column resonance caused by oscillation that the tire 100 receives from a road surface can be reduced while the vehicle with the vehicle wheel 1 of this embodiment mounted thereon is traveling, thus allowing an efficient reduction of the road noise due to the column resonance.

Next, the method for manufacturing the vehicle wheel 1 will be described. Molten metal of an aluminum alloy heated to and kept at a prescribed temperature is filled in a cavity of a casting die for molding the vehicle wheel 1 and then cooled, and the cast molded article 51 is taken out from the casting die. This process is referred to as casting step.

Figure 4:
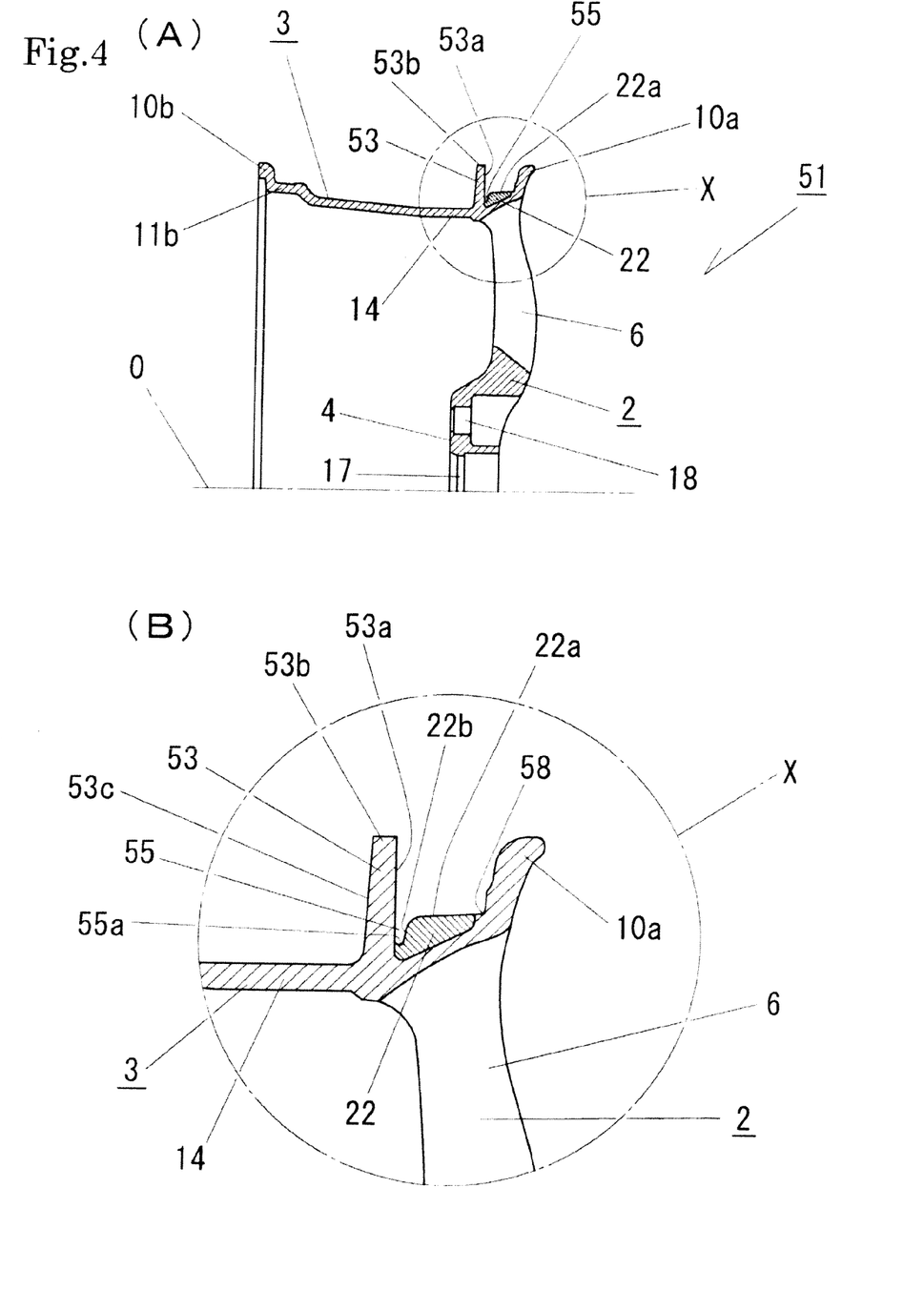
FIG. 4(A) is a vertical cross-sectional view of a cast molded article 51 which by a casting process.
FIG. 4(B) is an enlarged view of a X section.

The cast molded article 51 molded by the casting step is in a shape still having extra metal around the vehicle wheel 1. Accordingly, its surfaces are cut by the cutting process step which will be described later to mold it into the vehicle wheel 1 in desired dimensions and shape. In FIGS. 4(A) and 4(B) and 5(A) to 5(C), the extra metal portions are not shown. The portions where respective elements of the vehicle wheel 1 are formed will be given like numerals and symbols in the description. As shown in FIGS. 4(A) and 4(B), in the cast molded article 51 in this embodiment, the rim portion 3 has the front flange portion 10*a*, well portion 14, back bead seat portion 11*b*, and back flange portion 10*b* formed therein. A ring-shaped wall portion 53 protruding outward from an outside surface of the well portion 14 is circumferentially formed in a portion close to the front flange portion 10*a* of the well portion 14. Further, the three partition wall portions 22 along the front-back direction are formed at regular intervals in the wheel circumferential direction between the ring-shaped wall portion 53 and the front flange portion 10*a*. The cast molded article 51 does not have the front bead seat portion 11*a*.

The ring-shaped wall portion 53 is formed into a generally annular disc shape along the wheel radial direction. The radial width of the ring-shaped wall portion 53 in the wheel radial direction is set to be wider than the distance in the front-back direction from the position where it is formed to the front flange portion 10*a*. The partition wall portions 22 are formed in the front-back direction perpendicularly to the ring-shaped wall portion 53 and combined with the front flange portion 10*a* and the ring-shaped wall portion 53. The wall height in the wheel radial direction of the partition wall portions 22 is set to a prescribed height so that the front bead seat portion 11*a* can be formed by the ring-shaped wall portion 53 bent by the bending process step which will be described later. The wall height of the partition wall portions 22 is smaller compared to the width in the circumferential direction of the ring-shaped wall portion 53. The partition wall portion 22 determines the cross-sectional area of the sound absorbing area 25 (internal space of the rim cavity portion 21), and the shape (wall height and so forth) of the partition wall portion 22 is set such that the sound absorbing space 25 provides function and effect of the Helmholtz resonant sound absorber.

Furthermore, in this embodiment, a separation groove 55 is formed between the ring-shaped wall portion 53 and each of the partition wall portions 22. The separation groove 55 is formed along the partition wall portions 22 in their width direction (the width along the wheel circumferential direction). The groove width (the separation distance in the front-back direction) and groove depth (the depth in the wheel radial direction) of the separation groove 55 are preset, and a groove bottom surface 55*a* of the separation groove 55 is formed in a curved shape determined by a prescribed radius of curvature. The separation groove 55 has determined dimensions and shape according to the groove width, groove depth, and the radius of curvature of the groove bottom surface. These dimensions and shape are, as described later, appropriately set in response to the aperture ratio of communication gaps 61.

In such a casting step, a casting die is used that allows molding of the cast molded article 51. In this embodiment, the separation groove 55 is formed by the casting step. Conventionally-used casting methods, such as high pressure casting, low pressure casting, and gravity casting, can be applied to this casting step, and detailed descriptions thereof will be omitted.

Figure 5:
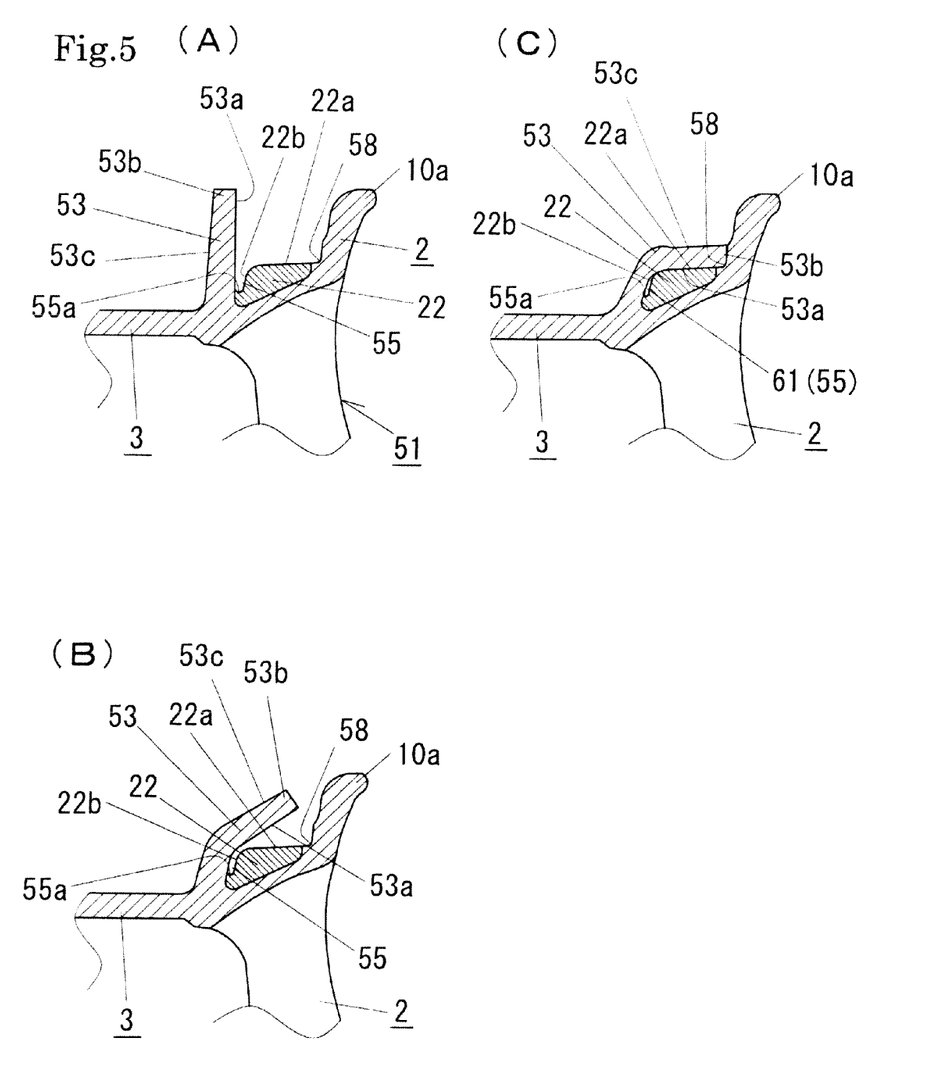
FIGS. 5(A) to 5(C) are explanatory diagrams for illustrating a bending process step.

After this casting step, in this embodiment, a stepped portion processing step is performed in which a step-shaped engagement stepped portion is circumferentially formed in a back base portion of the front flange portion 10 of the cast molded article 51 by a cutting process (FIGS. 4(A), 4(B), and 5(A)). In the stepped portion processing step, the shape of the ring-shaped wall portion 53 may be adjusted by cutting an outside wall surface 53*c* and outer circumferential end surface (not shown) of the ring-shaped wall portion 53. However, the cutting process is not performed at least on an inside wall surface 53*b* of the ring-shaped wall portion 53 and an outside end surfaces 22*a* of the partition wall portions 22, and their casting surface formed by casting are maintained.

After the stepped portion processing step, the bending process step is performed in which the ring-shaped wall portion 53 is bent toward the front flange portion 10*a* by a spinning process. As shown in FIGS. 5(A) to 5(C), in this bending process step, the ring-shaped wall portion 53 is bent such that its inside wall surface 53*a* corresponds to the outside end surfaces 22*a* of the partition wall portions 22. Accordingly, the ring-shaped wall portion 53 is bent at its generally middle portion in the radial direction which is at almost the same height as the wall height of the partition wall portions 22. The inside wall surface 53*a* of the ring-shaped wall portion 53 and each of the outside end surfaces 22*a* of the partition wall portions 22 contact with each other, and the outer circumferential end portion 53*b* of the bent ring-shaped wall portion 53 is seated on the engagement stepped portion 58 of the front flange portion 10*a*. Accordingly, the rim cavity portion 21 is formed in the wheel circumferential direction.

The separation groove 55 is provided between the ring-shaped wall portion 53 and each of the partition wall portions 22. Accordingly, the inside wall surface 53*a* of the bent ring-shaped wall portion 53 does not contact with back end surfaces 22*b* of the partition wall portions 22 forming the separation groove 55, and gaps are formed between the inside wall surface 53*a* and the back end surfaces 22*b*. Since the separation groove 55 is formed along the partition wall portions 22 in their width direction, the gaps communicate with areas parted by the partition wall portions 22 (the above-described sound absorbing spaces 25 adjacent to each other). In other words, these gaps form the communication gaps 61 in accordance with the present invention. Specifically describing a process for defining the communication gaps 61, the separation groove 55 formed between the ring-shaped wall portion 53 and the partition wall portion 22 has, as described above, the prescribed groove depth, groove width, and the groove bottom surface 55*a* at the prescribed radius of curvature. Accordingly, when the ring-shaped wall portion 53 undergoes the bending process, the separation groove 55 form gaps between the inside wall surface 53*a* of the ring-shaped wall portion 53 and the back end surfaces 22*b* of the partition wall portions 22. This formation of the gaps is achieved because the groove bottom surface 55*a* of the separation groove 55 is in the curved shape and even if the ring-shaped wall portion 53 is bent to contact with the outside end surfaces 22*a* of the partition walls 22, the inside wall surface 53*a* does not contact with the back end surface 22*b* in the portions having the separation groove 55. Hypothetically, if the separation groove were formed in a shape having a V-shaped cross section in which groove side surfaces intersect with each other, the ring-shaped wall portion would be apt to contact with the partition wall portions when the bending process were performed on the ring-shaped wall portion. Therefore, the separation groove having the V-shaped cross section would not be able to form a gap in a desired size and could possibly provide an accidental gap.

Further, the size of the communication gaps 61 can be set according to the dimensions and shape of the separation groove 55. In other words, the groove depth, groove width, and the radius of curvature of the groove bottom surface 55a of the separation groove 55 are appropriated set, and the size of the communication gaps 61 formed by the separation groove 55 can be thereby controlled. Accordingly, setting the dimensions and shape of the separation groove 55 allows formation of the communication gaps 61 in a desired size.

In this embodiment, in the stepped portion processing step, the surfaces of the ring-shaped wall portion 53 and the partition wall portions 22 are not cut and their casting surfaces are maintained. Accordingly, the inside wall surface 53a of the bent ring-shaped wall portion 53 and the outside end surfaces 22a of the partition wall portions highly tightly contact with each other. This allows the gap for communicating with areas (sound absorbing spaces 25 adjacent to each other) parted by the partition walls 22 to be limited to the communication gaps 61.

After the bending process step, a joining step is performed in which the outside end surface 53b of the ring-shaped wall portion 53 bent by the bending process step and the front flange portion 10a are welded together. In this joining step, by welding, those portions are welded together in the wheel circumferential direction. This forms the rim cavity portion 21. This welding step allows rigid welding between the bent ring-shaped wall portion 53 and the front flange portion 10a. Accordingly, the portion (the outer rim portion 8) formed by the bent ring-shaped wall portion 53 is allowed to have desired strength. Further, the internal spaces (sound absorbing spaces 25) of the rim cavity portions 21 formed by the bent ring-shaped wall portion 53 can be formed in a tightly sealed manner. The partition wall portions 22 define the three internal spaces in the wheel circumferential direction, which serve as the sound absorbing spaces 25. The sound absorbing spaces 25 formed in the welding step has not yet undergone the hole process step which will be described later and thus maintain high air-tightness.

Figure 6:
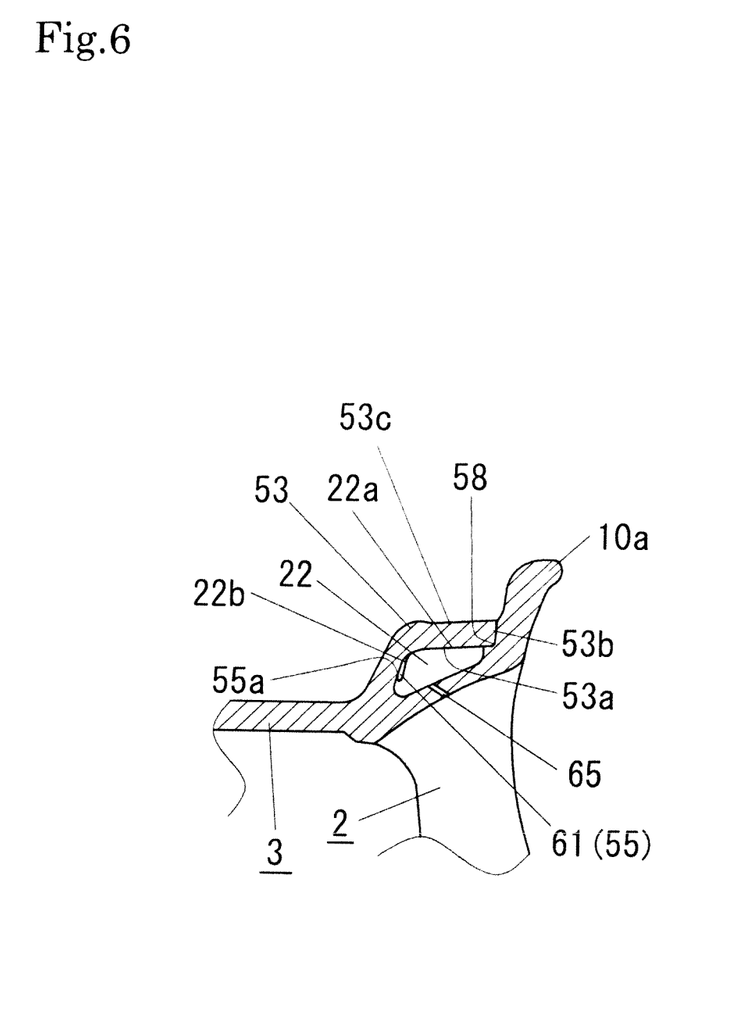
FIG. 6 is a partial vertical cross-sectional view of an outer rim portion 8 having an air hole 65 drilled therein.

In this embodiment, as shown in FIG. 6, after the joining step, a hole drilling step is performed in which a lead hole 65 for a valve hole (not shown) to be formed in the outer rim portion 8 is drilled from the design surface of the outer rim portion 8. Using this lead hole 65, an air hole 65 for communicating the internal space (any one of the sound absorbing spaces 25) of the rim cavity portion 21 with the outside is formed in the bending process step which will be described later. The adjacent sound absorbing spaces 25 communicate with each other by the communication gaps 61, and all the sound absorbing spaces 25 thus communicate with the air hole 65. The air hole 65 has a relatively small diameter since it only needs to serve as a lead hole for specifying the position where the valve hole is formed.

After the hole drilling step, the heat treatment step is performed. In this embodiment, in the heat treatment step, a T6 treatment is carried out as the heat treatment, in which a solution heat treatment in which a metal material of the wheel is heated at a prescribed treatment temperature and artificial aging in which the metal material undergone the solution heat treatment is kept at a prescribed temperature. This improves the strength of the metal material by homogenization and precipitation hardening of its inner structure. In this heat treatment step, since the metal material is heated at a relatively high treatment temperature, the air trapped in the sound absorbing spaces 25 expands by the heat. The rim cavity portion 21 configured with the sound absorbing spaces 25 is sealed by welding. However, the adjacent sound absorbing spaces 25 communicate with each other by the communication gaps 61 and thus share a unitary space via the communication gaps 61. Accordingly, the heat-expanded air in the sound absorbing spaces 25 is movable via the communication gaps 61, thus reducing the increase in the internal pressure in the sound absorbing spaces 25 due to the heat expansion. This allows a reduction in a load applied to the outer rim portion 8 because of the increase in the internal pressure and allows prevention of deformation of the outer rim portion 8 as much as possible. Particularly in this embodiment, since the air hole 65 is formed by the hole drilling step, the heat-expanded air in each of the sound absorbing spaces 25 moves via its communication gap 61 and can be discharged through the air hole 65. This further improves the effect of preventing deformation of the outer rim portion 8. As described above, if deformation of the outer rim portion 8 due to the heat expansion is relatively large or occurs on the design surface, the recovery from the deformation is difficult, thus resulting in a molding defect. On the other hand, the manufacturing method in accordance with this embodiment allows prevention of the deformation due to the heat expansion as much as possible and allows a reduction of molding defects.

In the welding step, even if the air in the sound absorbing spaces 25 expands due to the welding heat, deformation due to the heat expansion can be sufficiently prevented similarly to the prevention in heat treatment step. This also allows a reduction in improper welding caused by welding.

After the heat treatment step, the cutting process step is performed in which the vehicle wheel 1 is formed into a desired product shape by a cutting process. In this cutting process step, the outside wall surface 53c of the bent ring-shaped wall portion 53 is cut to form the well wall portion 15 and the front bead seat portion 11a. As shown in FIG. 3, the shape extending from the well portion 14 via the well wall portion 15 and the front bead seat portion 11a to the front flange portion 10a is adjusted to form a desired outer rim portion 8. Since the bent ring-shaped wall portion 53 is rigidly joined with the front flange portion 10a by the joining step, the cutting step does not cause deformation or the like, thus allowing easy and appropriate formation of the outer rim portion 8 into the desired shape. Furthermore, after the heat treatment step, since deformation of the outer rim portion 8 is prevented as much as possible, deficiency such as cracks due to the cutting process can be prevented.

After the step of forming the outer rim portion, the hole process is performed in which the communication holes 27 are drilled in the well wall portion 15 of the outer rim portion 8. The three communication holes 27 are formed at regular intervals in the wheel circumferential direction such that the single communication hole 27 is formed for each of the sound absorbing spaces 25 of the rim cavity portion 21. As described above, the communication holes 27 together with the sound absorbing spaces 25 configure the Helmholtz resonant sound absorber. Therefore, the opening diameter and position of the communication hole 27 are appropriately determined according to the volume of the sound absorbing space 25 such that the communication holes 27 can provide function and effect of the resonant sound absorber.

Further steps of drilling bolt holes and a valve hole, painting, and a prescribed examination are performed, and the vehicle wheel 1 in accordance with this embodiment can be manufactured. The same methods as the conventional art can be applied to the steps such as painting, and detailed description thereof will be omitted.

According to the method for manufacturing the vehicle wheel 1 of this embodiment, the Helmholtz resonant sound absorber can be configured in which the sound absorbing spaces 25 and the communication holes 27 formed in the outer rim portion 8 enable the effect of reducing road noise due to the column resonance that occurs in the tire-internal space 102. As described above, the separation groove 55 is formed between the ring-shaped wall portion 53 and the partition wall portions 22 that are molded by the casting step, and the ring-shaped wall portion 53 then undergoes the bending process. Accordingly, the communication gaps 61 can be stably defined between the ring-shaped wall portion 53 and the partition wall portions 22. Also as described above, the sound absorbing spaces 25 (internal spaces in the rim cavity portion 21) provide a unitary space using the communication gaps 61. Accordingly, in the heat treatment step, the increase in the internal pressure caused by the heat expansion of the air in the sound absorbing spaces 25 can be reduced, thus allowing prevention of the deformation caused by the increase in the internal pressure as much as possible. This allows a reduction of molding defects due to deformation of the outer rim portion 8. Furthermore, in the joining step, the air in sound absorbing spaces 25 may expand by the welding heat. However, the increase in the internal pressure can be reduced in the same manner as described above, thus allowing prevention of the deformation due to this increase as much as possible. Therefore, the method for manufacturing in accordance with this embodiment allows sufficient prevention of occurrences of molding defects and stable formation of the vehicle wheel 1 in the formation of the vehicle wheel 1 including the Helmholtz resonant sound absorber which reduces road noise. Accordingly, the method can be easily applied to a production line of the vehicle wheel 1 and allows production of the vehicle wheel 1 capable of reducing the road noise.

The communication gap 61 defined according to the separation groove 55 has its aperture ratio set within the range between 0.1% and 30% with respect to the cross-sectional area of the corresponding sound absorbing space 25 (internal space). In other words, in order to obtain a desired aperture ratio, the groove width and depth and the radius of curvature of the groove bottom surface of the separation groove 55 is set. As a specific example, it is assumed that the vehicle wheel 1 is an automobile wheel with a rim diameter of 16 inches and the cross-sectional area of the sound absorbing space 25 formed in the outer rim portion 8 is set to 120 mm. In such a case, the separation groove 55 is configured to have the groove width of 1 mm, the groove depth of 8 mm, and the radius of curvature of the groove bottom surface of 0.5 mm, and the communication gap with its aperture ratio of approximately 3% can be thereby formed. As described above, the dimensions and shape of the separation groove 55 are appropriately set in response to the size of the vehicle wheel 1 and the cross-sectional area of the sound absorbing space 25, thereby allowing stable formation of the communication gap 61 with a desired aperture ratio. According to the size of the vehicle wheel 1 and the dimensions and shape of the sound absorbing space 25, the dimensions of the separation groove 55 has to be appropriately set. However, the radius of curvature of the groove bottom surface of the separation groove 55 is preferably set between 0.3 and 3 mm. The radius of curvature has a preferable range, as described above, because the groove bottom surface of the separation groove 55 is formed into a curved shape and the communication gaps 61 can be thereby stably reproduced. Further, the radius of curvature is set in the above range, thereby allowing a further improvement in reproducibility of the communication gaps 61.

On the other hand, the above-described embodiment provides the manufacturing method in which the separation groove is formed by the casting step. However, a step of forming the separation groove may be provided after the casting step, and the bending process step may be performed after the step of forming the separation groove. For example, a process step of forming the separation groove may be set prior to the bending process step.

In the above-described embodiment, the hole drilling step of forming the air hole may be performed before the joining step. Accordingly, the heat-expanded air by the welding heat can be discharged through the air hole, thereby improving the effect of preventing improper welding. Instead of forming the air hole as the lead hole of the valve hole, the air hole may be drilled on the ring-shaped wall portion as a lead hole of the communication hole formed in the hole process step. Further, the air hole may be formed in any one of the sound absorbing spaces communicating with each other via the communication gaps or in the plurality of sound absorbing spaces.

In the above-described embodiment, the hole drilling step of forming the air hole is performed. However, the hole drilling step may not be performed before the heat treatment step. Also in such a case, the effect of preventing heat expansion provided by the communication gaps can be realized, and the above-described function and effect of the present invention can be realized.

In this embodiment, the sound absorbing spaces (internal spaces in the rim cavity portion) are formed in the outer rim portion. However, the sound absorbing spaces (internal spaces in the rim cavity portion) may be formed in the inner rim portion. Also in such a case, the sound absorbing spaces can be formed similarly to the formation in the outer rim portion. Further, the sound absorbing spaces may be formed in both the outer rim and inner rim portions.

In this embodiment, the vehicle wheel to be manufactured includes the sound absorbing spaces formed in the outer rim portion to configure the Helmholtz resonant sound absorber. However, alternatively, it is possible to manufacture the vehicle wheel including a Quincke interference silencer or a side-branch resonant sound absorber by use of the sound absorbing spaces. In the configurations including the Quincke interference silencer and the side-branch resonant sound absorber, similarly to the above-described embodiment, the separation groove is formed between the ring-shaped wall portion and partition wall portions. Accordingly, the vehicle wheel can be manufactured which provides the function and effect of reducing improper welding by forming the communication gaps having a desired aperture ratio and provides the function and effect of reducing acoustic cavity noise that occurs in the tire-internal space 102.

In case that the Quincke interference silencer or side-branch resonant sound absorber is configured, the sound absorbing spaces are set such that the sound wave of the sound absorbing spaces and the sound wave of the tire-internal space 102 interfere with each other and reduce each other. For example, the propagation length of the sound wave of the sound absorbing space is preferably set such that the phase difference between the sound waves of the sound absorbing space and the tire-internal space 102 becomes the half wavelength. Accordingly, the distances between the adjacent partition wall portions have to be set such that the sound absorbing spaces have the above propagation length.

The present invention is not limited to the above-described embodiment, but other modified configurations may also be appropriately carried out within the scope of the gist of the present invention. For example, the joining step may be performed by joining with a prescribed adhesive. In such a case, the air in the sound absorbing spaces does not expand due to the welding head, and the function and effect to manage this does not occur. Further, in the heat treatment step, a heat treatment method can be applied which corresponds to a metal material to be molded into the vehicle wheel.

DESCRIPTION OF REFERENCE NUMERALS AND SYMBOLS

1: vehicle wheel
2: disc portion
3: rim portion
8: outer rim portion
9: inner rim portion
10a: front flange portion
10b: back flange portion
11a: front bead seat portion
11b: back bead seat portion
14: well portion
21: rim cavity portion (internal space)
22: partition wall
22a: outside end surface
25: sound absorbing space
27: communication hole
53: ring-shaped wall portion
53a: inside wall surface
53b: outer circumferential end portion
55: separation groove
55a: groove bottom surface
61: communication gap

The invention claimed is:

1. A vehicle wheel manufacturing method, the vehicle wheel including:
  front and back flange portions and bead seat portions for supporting a bead of a tire; a well portion in a front-back direction which is formed between the front and back bead seat portions;
  a rim portion in which in an annular outer rim portion having the front flange portion and the front bead seat portion formed therein and/or in an annular inner rim portion having the back flange portion and the back bead seat portion formed therein, a rim cavity portion is circumferentially formed along a wheel circumferential direction, an internal space of the rim cavity portion is defined by a plurality of partition wall portions in the wheel circumferential direction to form sound absorbing spaces for damping a sound wave in a tire-internal space which is sealed by the rim portion and the tire mounted on the rim portion; and
  a disc portion coupled with an axle,
the method comprising:
  a casting step of circumferentially forming, in a portion adjacent to at least either one of the front and back sides, a ring-shaped wall portion which protrudes outward in a radial direction from an outside surface of the well portion of the rim portion and forming the plurality of partition wall portions at regular intervals in the wheel circumferential direction between the ring-shaped wall portion and the flange portion;
  a bending process step of bending the ring-shaped wall portion of the rim portion toward either one of the flange portions, bringing an inside wall surface of the ring-shaped wall portion into contact with an outside end surface of each of the partition wall portions, and bringing the outer circumferential end portion of the ring-shaped wall portion into contact with the flange portion in the wheel circumferential direction;
  a joining step of joining the outer circumferential end portion of the bent ring-shaped wall portion with the flange portion entirely in the wheel circumferential direction to form the bead seat portions and the rim cavity portion and to produce the sound absorbing spaces parted by each of the partition wall portions;
  a heat treatment step of performing a prescribed heat treatment; and
  a hole process step of drilling a communication hole in the bent ring-shaped wall portion, the communication hole communicating the sound absorbing spaces with outside;
  the steps being sequentially performed,
    wherein before the bending process step, a separation groove having a curved shape groove bottom surface at a prescribed depth is formed in a width direction of each of the partition wall portions between the ring-shaped wall portion and each of the partition wall portions, and
  by bending the ring-shaped wall portion toward the flange portion in the bending process step, communication gaps which communicate the adjacent sound absorbing spaces with each other are defined by the separation groove between the inside wall surface of the ring-shaped wall portion and the outside end surfaces of the partition wall portions.

2. The vehicle wheel manufacturing method according to claim 1, wherein the separation groove is formed between the ring-shaped wall portion and each of the partition wall portions such that an aperture ratio of the communication holes formed between the inside wall surface of the bent ring-shaped wall portion and the outside end surface of the partition wall portions with respect to cross-sectional areas of the sound absorbing spaces produced by the joining step falls within a range between 0.1% and 30%.

* * * * *